United States Patent [19]

Markey

[11] 4,091,442
[45] May 23, 1978

[54] TRAILER LIGHT

[76] Inventor: John Webb Markey, 2713 Sorrell St., Baton Rouge, La. 70805

[21] Appl. No.: 733,443

[22] Filed: Oct. 18, 1976

[51] Int. Cl.² .......................... B60Q 1/00; F21V 21/14
[52] U.S. Cl. ...................................... 362/61; 362/250; 362/369; 362/390; 362/427
[58] Field of Search ..................... 240/1 R, 7.1 R, 8.3, 240/52 R, 57, 67, 69, 90; 362/61, 71, 80, 83, 249, 250, 427, 428

[56] References Cited

U.S. PATENT DOCUMENTS

| | | | |
|---|---|---|---|
| 1,274,265 | 7/1918 | Hammond | 240/1 R X |
| 2,753,439 | 7/1956 | Greenfield | 240/7.1 R X |
| 3,331,957 | 7/1967 | Adams et al. | 240/8.3 |
| 3,885,146 | 5/1975 | Whitley | 240/8.3 X |

FOREIGN PATENT DOCUMENTS

| | | | |
|---|---|---|---|
| 1,806,228 | 5/1970 | Germany | 240/8.3 |
| 924,072 | 3/1955 | Germany | 240/90 |

*Primary Examiner*—Fred L. Braun
*Attorney, Agent, or Firm*—Edgar E. Spielman, Jr.; David L. Ray

[57] ABSTRACT

A trailer light assembly for use on boat trailers, which assembly is capable of maintaining a light fixture component of the assembly at such a height that the light fixture is not brought into contact with the water when the trailer is being used to launch or retrieve a boat. Maintenance of the desirable height is achieved by having the light fixture move upward or away from the water in response to a flotation device which is attached to the light fixture. The trailer light assembly may also feature a double-acting pivot point which will allow the flotation device to survive lateral forces thereon.

9 Claims, 6 Drawing Figures

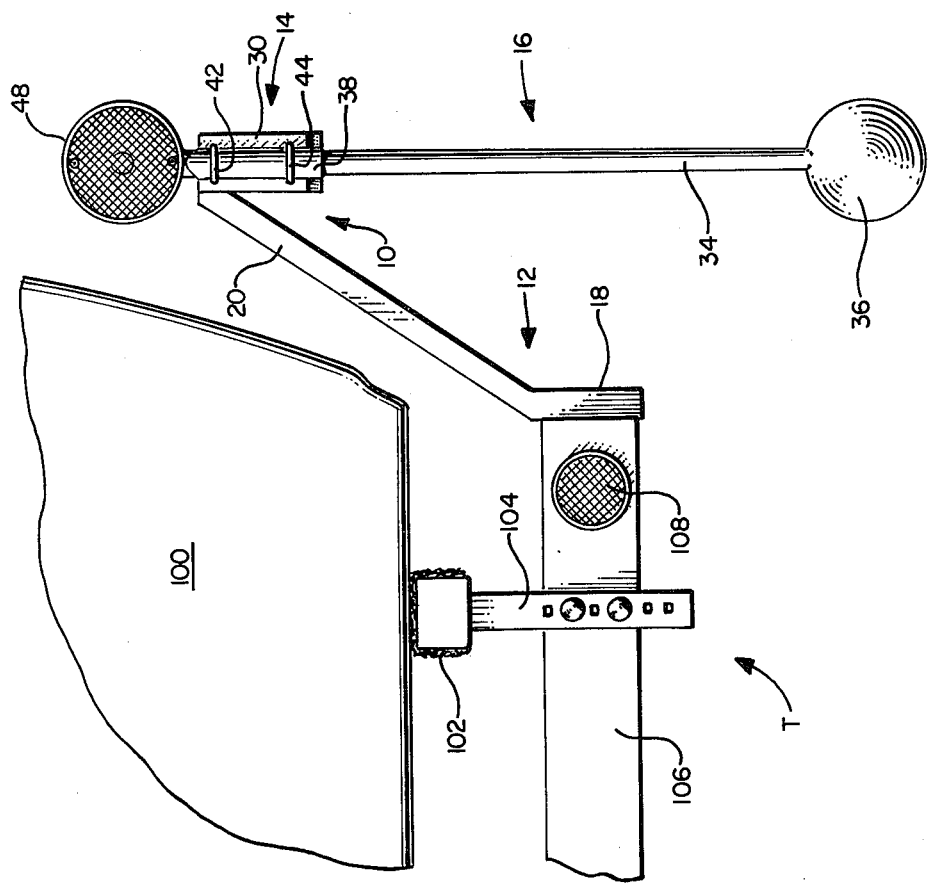
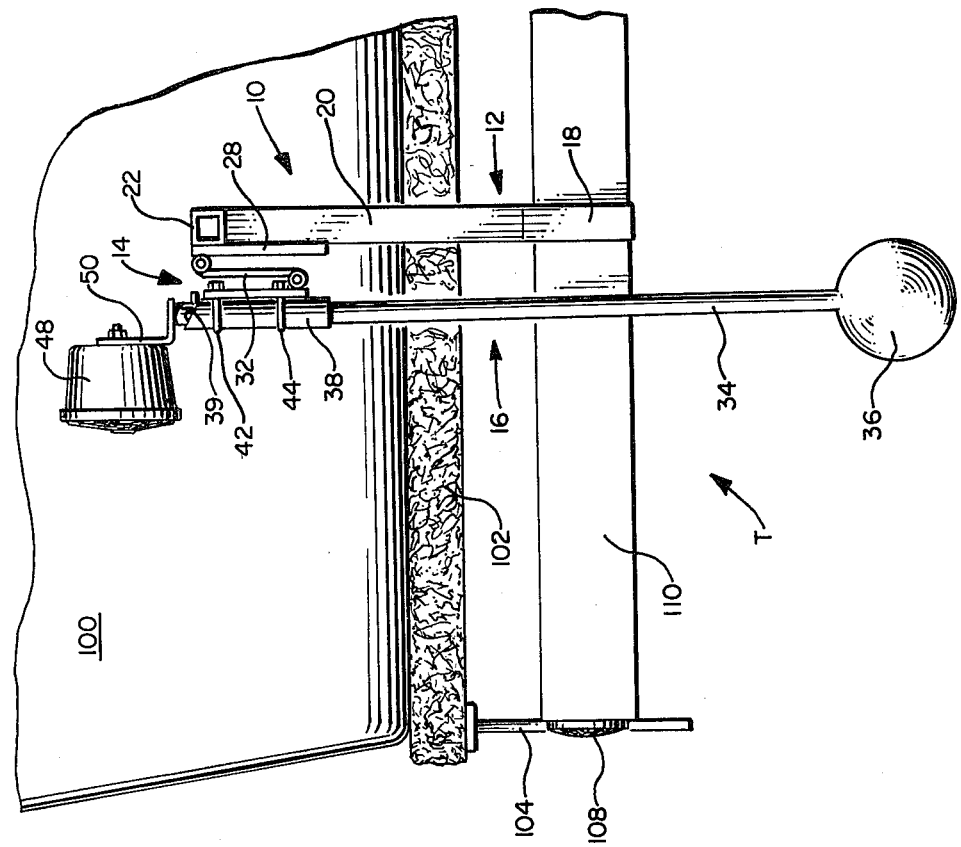
FIG. 2.
FIG. 1.

TRAILER LIGHT

BACKGROUND OF THE INVENTION

On trailers of all types it is the law in every state that the trailer be properly lighted with tail lights and in some cases with side lights. Side light requirements can generally be satisfied with the utilization of reflectors. However, the tail light or rear light requirements can only be practically satisfied by the utilization of an electrical light fixture.

While the utilization of electrical light fixtures on most trailers is satisfactory, the utilization of these fixtures on boat trailers is not fraught without great difficulty and expense. The difficulty and expense arises due to the fact that electrical lights are oftentimes submerged under water when the trailer is used in launching or retrieving a boat. Submersion of the lights in salt water will result in corrosion problems of the light socket and of the electrical terminals. Fracture of the light bulbs can also occur by submerging the light fixture in cold water when the bulbs are lit and thus very hot.

Therefore it is an object of this invention to provide a trailer electrical light assembly which maintains the light fixture component at a height above the water level when the trailer is used to launch or retrieve a boat. It is a further object of this invention to provide a trailer electrical light assembly which can also stand a lateral force applied thereto without causing damage to the assembly.

THE INVENTION

This invention relates to a trailer electrical light assembly for utilization on boat trailers. The assembly features mounting structure for mounting to the trailer; a hollow sleeve attached to the mounting assembly, the sleeve being mounted so that the long axis thereof is substantially perpendicular with the horizon; an elongated attaching rod slidably fitted within the sleeve; an electrical light fixture connected to the attaching rod at its upper end so that the light fixture will be positioned above the upper end of the sleeve; and a flotation device attached to the rod at its lower end so that the flotation device will be in a position below the lower end of the sleeve.

Another embodiment of this invention features the assembly described above except that the attaching sleeve is attached to the mounting structure by way of a pivoting assembly which assembly allows for lateral forces applied to either the light fixture or the flotation device to merely result in rotation of the sleeve and the attaching rod in the direction of the lateral force.

These and other features of this invention contributing satisfaction in use and economy in manufacture will be more fully understood from the following description of preferred embodiments of this invention when taken in connection with the accompanying drawings, wherein identical numerals refer to identical parts and in which:

FIG. 1 is a side elevational view of a trailer electrical light assembly of this invention with the assembly being attached to a trailer carrying a boat;

FIG. 2 is a front elevational view of the assembly shown in FIG. 1;

The following description describes a trailer electrical light assembly which would be utilized on one side of the trailer. A similar assembly would be utilized on the opposite side of the trailer to provide dual rear lighting of the trailer as required by most state laws. Since both the right and left side assemblies would be identical in description, the left side assembly is not described herein.

Figure 6:
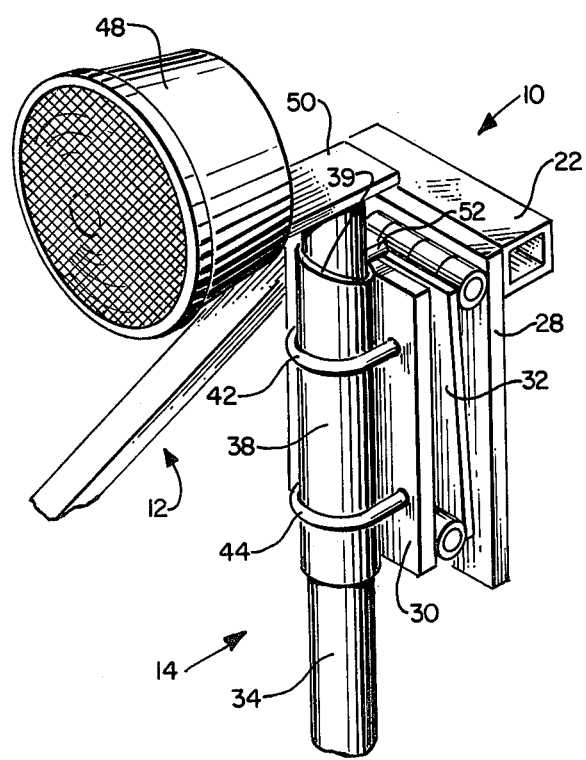
FIG. 6 is a partial, enlarged, perspective view of the embodiment shown in FIG. 1.

Referring now to FIGS. 1, 2 and 6, it can be seen that a trailer electrical light assembly of this invention, generally designated by the numeral 10 has mounting structure, generally designated by the numeral 12, pivoting assembly, generally designated by the numeral 14 and light-flotation structure, generally designated by the numeral 16.

Trailer light assembly 10 is shown in FIGS. 1 and 2 to be attached to side frame member 110 of partially shown trailer T. The relationship between the light assembly 10 and the trailer T is shown in FIG. 2 when viewing the trailer from the rear. As can be seen when viewed from the rear, trailer T has rear frame member 106 which has attached thereto adjustable support member 104 which carries at its uppermost end strut 102. Strut 102 is utilized to support boat 100 which is partially shown in FIGS. 1 and 2. Also carried by rear frame member 106 is auxillary reflector 108. The trailer structure shown in FIGS. 1 and 2 typifies typical trailer construction and is not meant in any way to limit the assembly of this invention and it is to be understood that various trailer constructions may be utilized in conjunction with the assembly of this invention.

As can be seen in FIGS. 1 and 2, supporting structure 12 comprises three members. The first member 18 is attached to side frame member 110. This attachment may be made by means of welding or by the utilization of U-bolts. At the upper end of first member 18 is second member 20 which angles outwardly from trailer T and boat 100. The angle formed by second member 20 and structural member 18 can be any convenient angle that provides for sufficient clearance between assembly 10 and boat 100. At the uppermost end of second member 20 is third member 22. Third member 22 is shown in FIGS. 1 and 2 to be parallel with the horizon. This particular angle is one of convenience, it being understood that third member 22 may be at any angle as long as pivoting assembly 14 is mountable thereon.

Pivoting assembly 14 is attached to mounting structure 12 by means of mounting plate 28. Mounting plate 28 is merely welded to the outside face of third member 22. Attached at the upper end of mounting plate 28 is a conventional spring-loaded, double-acting hinge 32. Attached to the other end of spring-loaded, double-acting hinge 32 is sleeve mounting plate 30. Attachment of spring-loaded, double-acting hinge 32 to mounting plate 28 and sleeve mounting plate 30 can easily be achieved by welding.

Sleeve mounting plate 30, in conjunction with U-bolts 42 and 44, is utilized to attach light flotation structure 16 to spring-loaded, double-acting hinge 32.

As can be seen in FIGS. 1, 2 and 6, U-bolts 42 and 44 rigidly hold sleeve 38 against sleeve mounting plate 30. Slidably received within sleeve 38 is attaching rod 34. Attaching rod 34 has attached at one of its ends flotation device 36 and at the other of its ends electrical light fixture 48. Attachment of electrical light fixture 48 to attaching rod 34 is achieved by the utilization of L-shaped mounting bracket 50. The length of attaching rod 34 should be such that electrical light fixture 48 will always be above the water level when flotation device 36 is caused to be floated up to the lowermost end of sleeve 38. It has been found that attaching rod 34 is preferably of a length within the range of from about ½ to about 3 feet. The preferred dimension being dependent on the height of the trailer and the anticipated depth of the water into which the trailer will be placed. Having attaching rod 34 too short will not allow enough rod travel for maintenance of light fixture 48 out of the water while a rod length too long will result in dragging of flotation device 36 on the ground when the trailer is out of the water.

In a preferred embodiment, sleeve 38 and attaching rod 34 include anti-rotational structure. Reference is had to FIG. 6 wherein sleeve 38 is shown to have a beveled upper end with the highest portion of the bevel being positioned toward the back of trailer T. Mounted onto attaching sleeve 34 is anti-rotational knob 52. As can be appreciated, rotation of attaching rod 34 is discouraged by the upward bias of the bevel 39 as anti-rotational knob 52 rides thereon.

It should be noted that the electrical wiring to electric light fixture 48 is not shown in the drawings. The utilization of conventional wiring to the fixture may be used with routing of the wiring being conveniently made through the hollow portion of mounting structure 12. Attachment of the wires will be made to the main trailer wires in the conventional manner.

Preferably, components of the light assembly of this invention are made of non-corrosive materials. For example, aluminum, stainless steel, etc., have been found suitable.

Figure 3:
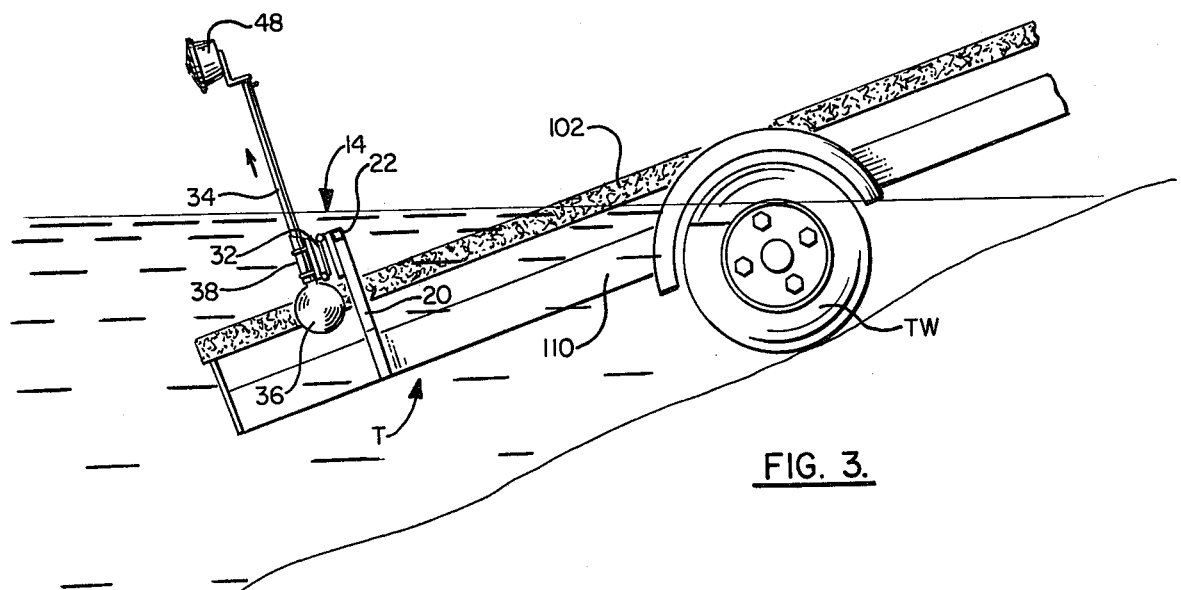
FIG. 3 is a side elevational view of the assembly shown in FIG. 1 when the trailer is partially submerged in water.

In operation, the light assembly of this invention is the paragon of simplicity. FIG. 3 shows how the light assembly operates to prevent submersion of electric light fixture 48. As the trailer T is rolled into the water, even to a point where trailer wheels TW are mostly submerged, light fixture 48 is still above the water level. Movement of light fixture 48 to this high position is achieved by the positive buoyancy provided by flotation device 36 which causes attaching rod 34 to move upward and thus light fixture 48 which is attached to the upper end thereof. As trailer T is pulled from the water the buoyant force is relieved from flotation device 36 and attaching rod 34 will slide downward inside of sleeve 38 thus resulting in the lowering of light fixture 48.

Figure 4:
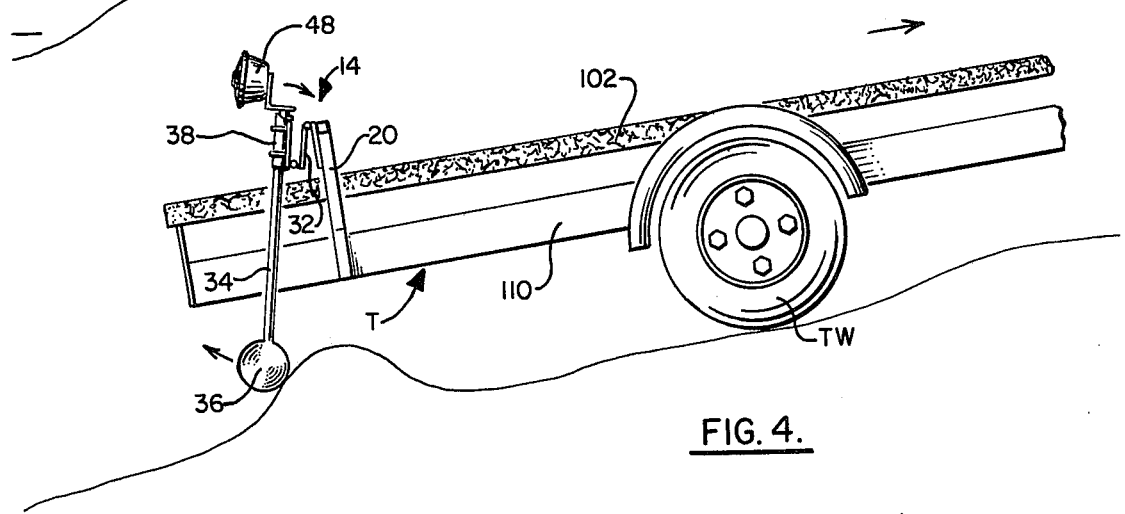
FIG. 4 is a side elevational view of the assembly shown in FIG. 1 showing the reaction of the pivoting assembly when lateral forces are applied to the flotation device of the light assembly.
Figure 5:
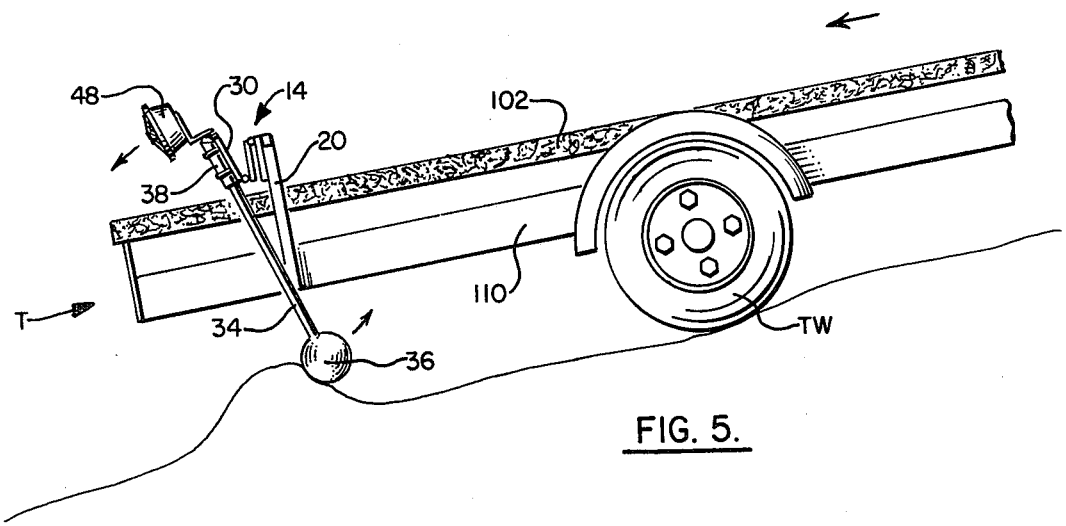
FIG. 5 is a side elevational view of the assembly shown in FIG. 1 showing the resultant motion when lateral forces opposite those depicted in FIG. 4 are applied to the electrical light assembly.

FIGS. 4 and 5 show how the pivot assembly 14 operates to prevent damage to the trailer light assembly 10. As shown in FIGS. 4 and 5, lateral forces on flotation device 36 can be caused by flotation device 36 encountering a bump in the road or at the trailer landing. Since trailer T will be either moving forward as shown in FIG. 4 or backward as shown in FIG. 5, a lateral force substantially parallel to the center axis of the trailer will be applied to flotation device 36. When the trailer is moving forward the lateral force applied to flotation device 36 will be towards the rear which will cause spring-loaded, double-acting hinge 32 to open away from mounting plate 28. When trailer T is moving rearward as shown in FIG. 5, and flotation device 36 encounters an immovable object, the lateral force will be applied towards the front of the trailer causing spring-loaded, double-acting hinge 32 to open away from sleeve mount 30. Therefore it can be appreciated that such lateral forces on flotation member 36 does not affect or damage trailer light assembly 10 but will only result in rotation of the light-flotation structure 16 which rotation is harmless due to the utilization of pivoting assembly 14.

Flotation device 36 is shown in the drawings to be a hollow ball. It is to be understood, of course, that flotation device 36 can be of any material with any design as long as such device is capable of providing sufficient buoyant force to cause attaching rod 34 to rise within sleeve 38.

What is claimed is:

1. A trailer electrical light assembly mountable to a trailer, which assembly comprises:
   a. mounting means attachable to the side of said trailer;
   b. an elongated, hollow sleeve attached to said mounting means at a point above the attachment point of said mounting means to said trailer, said sleeve having its long axis substantially perpendicular to the horizon;
   c. an elongated rod slidably fitted within said sleeve;
   d. an electrical light fixture attached to said rod at a point adjacent its upper end so that said light fixture will be positioned above the upper end of said sleeve; and
   e. a flotation device attached to said rod at a point adjacent its lower end so that said flotation device will be positioned below the lower end of said sleeve.

2. The trailer electrical light assembly of claim 1 wherein said rod has a length within the range of from about 1½ to about 3 feet.

3. The trailer electrical light assembly of claim 2 wherein there is additionally provided a first anti-rotational means upon said sleeve and second anti-rotational means on said rod, said first and second means cooperable one with the other to prevent rotation of said rod about its long axis, and wherein there is additionally provided pivoting means which attaches said sleeve to said mounting means so that a pivot point, which is transverse to the long axis of said trailer, is provided whereby said flotation device can pivot upon application of forces to said flotation device when said forces are in a plane substantially parallel along the axis of said trailer.

4. The trailer electrical light assembly of claim 1 wherein there is additionallly provided a first anti-rotational means upon said sleeve and second anti-rotational means on said rod, said first and second means cooperable one with the other to prevent rotation of said rod about its long axis.

5. The trailer electrical light assembly of claim 4 wherein said first anti-rotational means comprises a beveled upper end on said sleeve, the uppermost end of said bevel being positioned towards the back of said trailer and said second anti-rotational means comprises an anti-rotational knob at the upper end of said rod and at a point on said rod whereby said rotational knob faces towards the front of said trailer and rests on the lowermost end of said bevel.

6. The trailer electrical light assembly of claim 1 wherein there is additionally provided pivoting means which attaches said sleeve to said mounting means so that a pivot point which is transverse to the long axis of said trailer is provided whereby said flotation device can pivot upon application of forces to said flotation device when said forces are in a plane substantially parallel along the axis of said trailer.

7. The trailer electrical light assembly of claim 6 wherein said pivoting means comprises a spring-loaded, double-acting hinge, the upper end of said double-acting hinge being attached to said mounting means and the lower end of said double-acting hinge being attached to said sleeve.

8. The trailer electrical light assembly of claim 1 wherein there is additionally provided a first anti-rotational means upon said sleeve and second anti-rotational means on said rod, said first and second means cooperable one with the other to prevent rotation of said rod about its long axis, and wherein there is additionally provided pivoting means which attaches said sleeve to said mounting means so that a pivot point, which is transverse to the long axis of said trailer, is provided whereby said flotation device can pivot upon application of forces to said flotation device when said forces are in a plane substantially parallel along the axis of said trailer.

9. The trailer electrical light assembly of claim 8 wherein said first anti-rotational means comprises a beveled upper end on said sleeve, the uppermost end of said bevel being positioned towards the back of said trailer and said second anit-rotational means comprises an anti-rotational knob at the upper end of said rod and at a point on said rod whereby said rotational knob faces towards the front of said trailer and rests on the lowermost end of said bevel; and wherein said pivoting means comprises a spring-loaded, double-acting hinge, the upper end of said double-acting hinge being attached to said mounting means and the lower end of said double-acting hinge being attached to said sleeve.

* * * * *